May 30, 1933.  L. BENDER  1,911,258
EXPOSURE GUARD FOR CAMERAS
Filed June 8, 1931
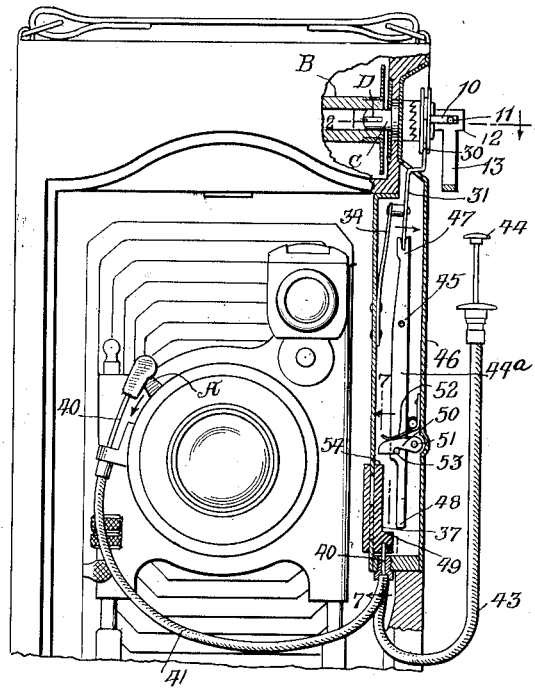
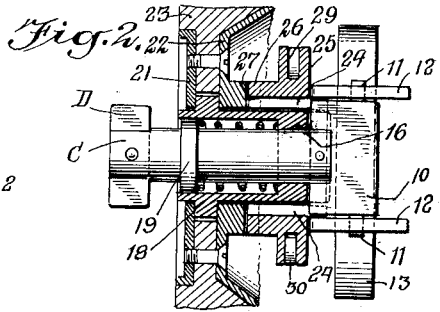
INVENTOR
Louis Bender
BY
ATTORNEYS
WITNESSES Patented May 30, 1933

1,911,258

UNITED STATES PATENT OFFICE

LOUIS BENDER, OF RIDGEWOOD, NEW YORK

EXPOSURE GUARD FOR CAMERAS

Application filed June 8, 1931. Serial No. 542,954.

This invention relates to cameras, and has particular reference to a device for reducing to a minimum and practically precluding the possibility of effecting a double exposure on the same film area and preventing the failure to effect an exposure upon one or more of the film areas.

The invention broadly aims to provide a mechanism interposed between and cooperating respectively with the shutter actuating means and the means for presenting or framing the film areas for exposure, which mechanism after each manipulation of the shutter actuating means, locks said means against a subsequent manipulation until the means for presenting or framing the next film area for exposure has been operated.

The invention also comprehends a mechanism of the character set forth, which further functions, after presentation of a new film area for exposure, to prevent a subsequent manipulation of the film presenting or framing means until the shutter actuating means has been operated to expose the frame, whereby to obviate the possibility of failure to effect the exposure.

Other objects of the invention reside in the production of a mechanism of the indicated character which employs but few and simple parts capable of economical production, assemblage and incorporation in a camera structure, and which mechanism efficiently accomplishes the intended purposes.

With the above recited and other objects in view, reference is had to the following description and accompanying drawing, in which there is exhibited a single and preferred embodiment of the invention, while the claims define the actual scope of the same.

In the drawing:

Figure 1 is a fragmentary front view of a camera equipped with an exposure guard mechanism constructed in accordance with the invention, parts being broken away and shown in section to disclose the underlying structure.

Figure 2 is an enlarged fragmentary sectional view taken approximately on the line indicated at 2—2 in Figure 1.

Figure 3 is an enlarged fragmentary sectional view illustrating the position of the parts of the mechanism during the actuation of the shutter actuating means.

Figure 4 is a similar view illustrating the position of parts after the completion of the manipulation of the shutter actuating means and showing the manner in which said means is locked against a subsequent actuation.

Figure 5 is a similar view illustrating the movement of the key to manipulating position for turning the film roll to present or frame a new area of the film for exposure.

Figure 6 is a view illustrating the movement of the key of the film area presenting or framing means to an inactive position for releasing and holding the mechanism released to permit of the exposure of a new film area.

Figure 7 is an enlarged fragmentary sectional view taken approximately on the line 7—7 of Figure 1.

Referring to the drawing by characters of reference, A designates the shutter actuating arm of the camera, which upon downward movement in the direction indicated by the arrow in Figure 1 is designed to effect the opening of the shutter and the exposure of the framed film area in the usual manner. B designates the usual film spool upon which the film strip is wound by means of a spindle C, it being understood that the spindle and spool have the usual form of interengageable coupling D which is engaged by inward movement of the spindle and disengaged by outward movement thereof. The spindle in the present instance has secured thereto for turning and shifting movement thereof a flat head 10 having laterally projecting trunnions 11 upon which the terminals 12 of a manipulating key 13 are journaled for swinging movement from an outwardly extending active position to a right angularly disposed inactive position. The terminals 12 are shaped to form cams having angularly disposed faces 14 and 15 which are respectively spaced different relative distances from the fulcrum point provided by the trunnions 11, and which cam faces accomplish a purpose which will hereinafter be developed. The spindle is mounted for axial sliding movement through the headed outer end 16 of a thimble 17, and said thimble is normally shifted inwardly by a spring 18 which surrounds the spindle and is interposed between the headed outer end of the thimble and an abutment flange 19 which is secured to the spindle adjacent its inner end. The thimble 17 is swiveled by means of an annular outwardly projecting flange 20 which is disposed between the inner and outer plates 21 and 22 carried by the side wall 23 of the camera body. The flat head 10 at the outer end of the spindle is engageable within grooves 24 in the thimble head when the thimble is moved inwardly under the influence of the spring 18 and is disengageable therefrom when the spindle is pulled outwardly. A clutch sleeve 25 surrounds the thimble 17 and is provided with clutch teeth 26 on its inner surface designed to be engaged with or disengaged from stationary clutch teeth 27 on the outer plate 22. The clutch sleeve is provided on its inner periphery with radial grooves 28, with which the flat head 10 is also designed to engage for turning the clutch sleeve with the thimble 17 and spindle C. The clutch sleeve is further provided with an annular peripheral groove 29 within which a forked terminal 30 of a shifting lever 31 is engaged. The shifting lever 31 is secured intermediate its ends as at 32 to the free end 33 of a leaf spring 34 which is anchored at its opposite end 35 to an inner housing plate 36. The means for imparting movement to the shutter actuating element or arm A includes a vertically movable slide 37 which is mounted on the inner housing plate for guided movement through the medium of a pin 38 and slot 39. The slide is connected by a flexible shaft 40 to the actuator arm A, said shaft extending through a flexible tubing 41. A flexible manipulator shaft 42 is also connected with the slide and extends through a flexible tubing 43 with the exposed end of the shaft formed with a manipulator button 44. Obviously, when the button 44 is pressed inwardly, the slide 37 is moved upwardly and in so moving exerts a pull on the flexible shaft 40 to depress the shutter actuating arm A, it being understood that the spring (not shown) which forms a part of the shutter mechanism and which returns the shutter arm A to its upper normal position also functions to return the slide to its lower normal position.

In order to provide means for locking the slide against movement to prevent actuation of the shutter, a locking lever 44a is provided which is fulcrumed as at 45 between the inner housing plate 36 and an outer housing plate 46. The upper bifurcated end 47 of the locking lever receives between the furcations thereof, the lower extremity of the shifting lever 31 and the lower terminal 48 of the locking lever is designed when moved inwardly to the position illustrated in Figures 4 and 5 of the drawing, to be disposed in the path of movement of the shoulder 49 formed on the slide. The inherent spring action of the leaf spring 34 acting through the shift lever 31 and the bifurcated upper extremity 47 of the locking lever tends to effect the inward movement of the lower extremity 48 of the locking lever to its obstructing position. A detent dog 50 is provided which is fulcrumed as at 51, and said dog is normally urged by a spring 52 to engage with a laterally projecting pin 53 on the locking lever to hold the lower end 48 of the same out of the path of movement of the shoulder 49 so as to permit of actuation of the shutter and upward movement of the slide 37. The free end of the dog is disposed in the path of movement of the upper end 54 of the slide when said slide approaches the uppermost limit of its movement whereby the dog may be tripped to release the same from engagement with the pin 53.

In use and operation, assuming the parts to be in the position illustrated in Figure 1 and an unexposed film area properly presented or framed for exposure, the user depresses the button 44, thereby effecting upward movement of the slide, exerting a downward movement of the shutter actuator arm A through the medium of the flexible shaft 40. As the slide moves upwardly, its upper end 54 trips the dog 50, thereby releasing said dog from the pin 53 and permitting the spring 34 to function through the lower portion of the shift lever 31 to swing the lower end 48 of the locking lever 44a inwardly against the lower portion of the slide 37. As the slide moves downwardly due to the pull exerted by the return movement of the actuator arm A, the lower extremity 48 of the locking lever 44a snaps over to a position in the path of subsequent upward movement of the shoulder 49 of the slide, thereby locking the slide, the manipulating shaft 42 and shaft 40 to prevent a subsequent actuation of the shutter arm A. In order to move the locking lever so that its lower terminal 48 will be retracted from the obstructed position illustrated in Figures 4 and 5, it is necessary for the user of the camera to first swing the key 13 from its depending vertical position to its horizontal position as illustrated in Figure 5, and thence downwardly to return it to its vertical position. Obviously, if the user swings the key to the horizontal position, it is unlikely that he will fail to turn the film spool to present or frame a new film area for exposure. When the key 13 is swung upwardly after an exposure has been made, the cam face 15 being closer to the axes 11, permits the leaf spring 34 to move the clutch sleeve outwardly, whereby the teeth 26 are disengaged from the teeth 27, thus freeing the key, clutch sleeve, thimble and spindle for turning movement to rotate the film spool B. After the film spool has been turned to position or frame a new film area for exposure, the key 13 is again swung downwardly, as illustrated in Figure 6. The downward swinging movement of the key cams the clutch sleeve 25 inwardly, thereby re-engaging the clutch teeth 26 with the clutch teeth 27 and at the same time exerting an inward movement through the shift lever 31 against the action of the leaf spring 34 of the upper end of the locking lever 44a, swinging the lower extremity 48 of the locking lever outwardly out of the path of movement of the shoulder 49 and permitting the detent dog 50 to drop or to be returned by its spring 52 to a detaining position with reference to the pin 53. If for any reason the operator should attempt to again turn the spindle without having made an exposure, by moving the key to a horizontal position, it will be found that the clutch teeth 26 engaging with the clutch teeth 27 will prevent such a turning movement, thereby defeating the possibility of moving the film area before it has been exposed. This is due to the fact that the locking dog maintains the locking lever 44a in such position that the shift lever 31 is held against a complete outward movement, and this complete outward movement can only be effected after the locking dog has again been released by upward movement of the slide to effect an actuation of the camera arm. It is, of course, obvious that after the shutter has been actuated to effect the exposure and the slide has been moved upwardly to release the dog, the locking lever will permit the full outward movement of the clutch lever 25, so that the film spool may be turned by the key 13 when swung to its horizontal position.

From the foregoing, it will thus be seen that a simple and effective device has been devised for the purpose of preventing double exposure and avoiding the failure to expose the film area.

What is claimed is:

1. In a device of the character set forth as and for the purpose specified, the combination with a manipulating key movable from an inactive to an active position for successively presenting film areas for exposure and means operable by the key when in its inactive position for preventing presentation of a succeeding film area, of means for locking the shutter against successive actuations and a connection between said latter means and the former means for releasing the shutter locking means after the manipulating key has been moved from its inactive position to its active position and returned to its inactive position.

2. In a device of the character set forth as and for the purpose specified, the combination with a manipulating key movable from an inactive to an active position for successively presenting film areas for exposure and means operable by the key when in its inactive position for preventing presentation of a succeeding film area, of means for locking the shutter against successive actuations and a connection between said latter means and the former means for releasing the shutter locking means after the manipulating key has been moved from its inactive position to its active position and returned to its inactive position, said connection also functioning to prevent presentation of a succeeding film area until after the shutter locking means has been released.

3. An exposure guard for cameras having the combination of a key movable from an inactive position to an active position for presenting the film areas for exposure, a clutch actuable by the key when inactive for rendering the film presenting means inoperative, a slide movable by and with the camera shutter actuator, a normally restrained detent releasable by operation of the shutter actuator to prevent subsequent actuation of the shutter and a connection between the clutch and detent operable to restore the detent to its restrained position when the key has been moved to its active position and returned to its inactive position.

4. An exposure guard for cameras having the combination of a key movable from an inactive position to an active position for presenting the film areas for exposure, a clutch actuable by the key when inactive for rendering the film presenting means inoperative, a slide movable by and with the camera shutter actuator, a normally restrained detent releasable by operation of the shutter actuator to prevent subsequent actuation of the shutter and a connection between the clutch and detent operable to restore the detent to its restrained position when the key has been moved to its active position and returned to its inactive position, said connection also functioning to prevent complete release of the clutch until after the detent has been released by the actuation of the shutter.

5. In a camera having a shutter actuator and a film area presenting means, the combination of a device for preventing a double exposure including a slide movable by and with the shutter actuator, a locking lever movable to a position to obstruct the movement of the slide and prevent actuation of the shutter, a pawl for holding said locking lever inactive, said pawl being disposed in the path of movement of the slide for release thereby, a pivoted manipulating key for the film presenting means, said key being swingable from an inactive to an active position, a shiftable clutch operable in one position to lock the film presenting means against movement and movable to said position by the key when in its inactive position, a common spring pressed member for urging said clutch to a released position and for swinging said locking lever to a position to obstruct the movement of the slide.

6. The combination with a camera of mechanism interposed between and cooperating respectively with the shutter actuating means and the film area framing means and operable upon each manipulation of the shutter actuating means to lock the same against subsequent actuation until the film area framing means has been manipulated, said mechanism including a slide movable by and with the shutter actuator, a locking lever movable to a position to obstruct movement of the slide and prevent actuation of the shutter, a pawl engageable with the locking lever for holding the same inactive, said pawl being disposed in the path of movement of the slide for release thereby, a pivoted key for the film framing means, said key being swingable from an inactive position to an active position, a shiftable clutch operable in one position to lock the film framing means against movement and movable to said position by the key when in its inactive position, a common spring pressed member for urging said clutch to a released position and for swinging said locking member to a position to obstruct the movement of the slide.

7. The combination with a camera of mechanism interposed between and cooperating respectively with the shutter actuating means and the film area framing means and operable upon each manipulation of the shutter actuating means to lock the same against subsequent actuation until the film area framing means has been manipulated, said mechanism including a slide movable by and with the shutter actuator, a locking lever movable to a position to obstruct movement of the slide and prevent actuation of the shutter, a pawl engageable with the locking lever for holding the same inactive, said pawl being disposed in the path of movement of the slide for release thereby, a pivoted key for the film framing means, said key being swingable from an inactive position to an active position, a shiftable clutch operable in one position to lock the film framing means against movement and movable to said position by the key when in its inactive position, a common spring pressed member for urging said clutch to a released position and for swinging said locking member to a position to obstruct the movement of the slide, said member also functioning to prevent complete release of the clutch when the locking lever is held inactive by the pawl whereby to prevent a successive actuation of the film framing means until an exposure has been made.

LOUIS BENDER.